No. 706,473. Patented Aug. 5, 1902.
H. F. LOW.
DISH WASHING MACHINE.
(Application filed Oct. 28, 1901. Renewed July 14, 1902.)
(No Model.) 2 Sheets—Sheet 1.
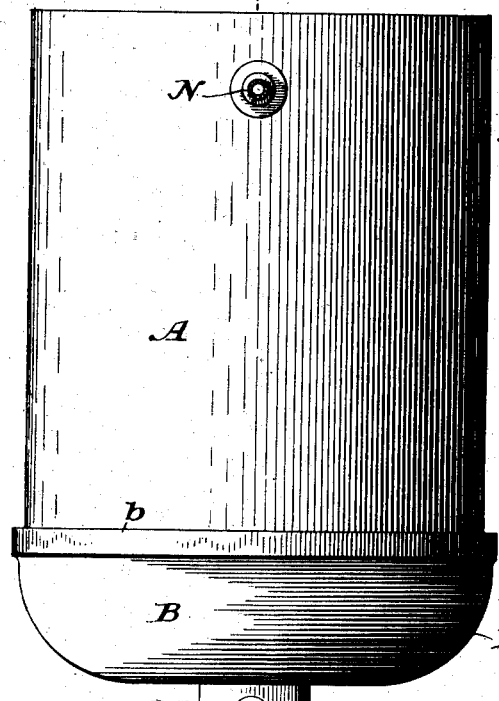
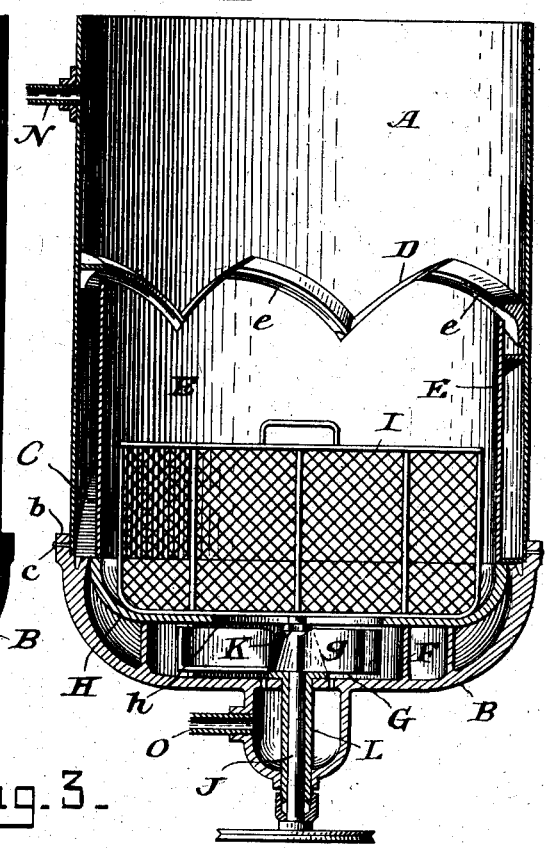
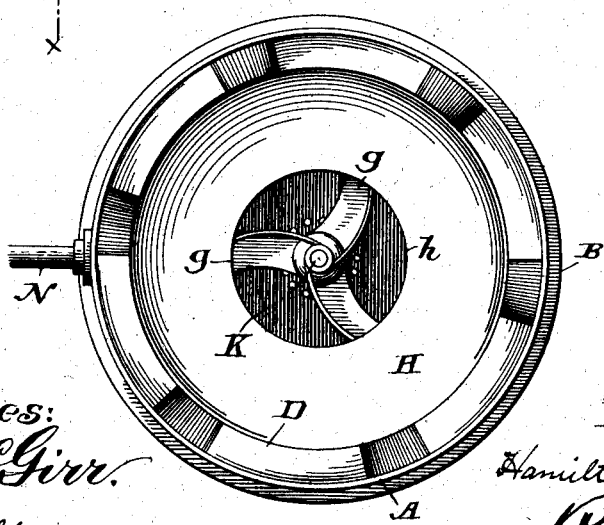
Witnesses:
J. B. McGirr.
E. B. Bolton.
Inventor
Hamilton F. Low
By Richards & Co.
his Attorneys
THE NORRIS PETERS CO., PHOTO-LITHO., WASHINGTON, D. C.

No. 706,473. Patented Aug. 5, 1902.
H. F. LOW.
DISH WASHING MACHINE.
(Application filed Oct. 28, 1901. Renewed July 14, 1902.)
(No Model.) 2 Sheets—Sheet 2.

Witnesses:
J. B. McGivr.
E. B. Bolton.

Inventor
Hamilton F. Low
By Richards & Co.
his Attorneys.

UNITED STATES PATENT OFFICE.

HAMILTON F. LOW, OF NEW YORK, N. Y.

DISH-WASHING MACHINE.

SPECIFICATION forming part of Letters Patent No. 706,473, dated August 5, 1902.

Application filed October 28, 1901. Renewed July 14, 1902. Serial No. 115,561. (No model.)

*To all whom it may concern:*

Be it known that I, HAMILTON F. LOW, a citizen of the United States, and a resident of the city, county, and State of New York, have invented certain new and useful Improvements in Dish-Washing Machines, of which the following is a full, clear, and exact specification.

The present invention is an improvement on the constructions described and illustrated in Letters Patent No. 482,313, granted to me September 6, 1892, and No. 516,605, granted to me jointly with Lucius A. Thompson March 13, 1894.

My invention consists of a tank or vessel provided on its inner surface with ribs, a lining within the vessel, a lower casing containing ribs, and a fan or agitator carried within said casing, and other details of structure and combinations of parts hereinafter more fully described, and particularly pointed out in the claims.

Figure 4:
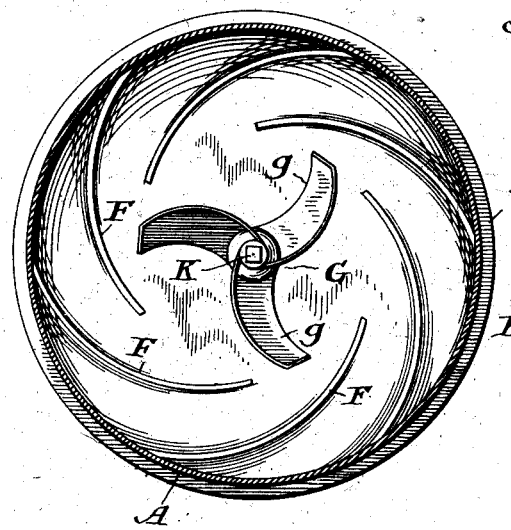
Figure 5:
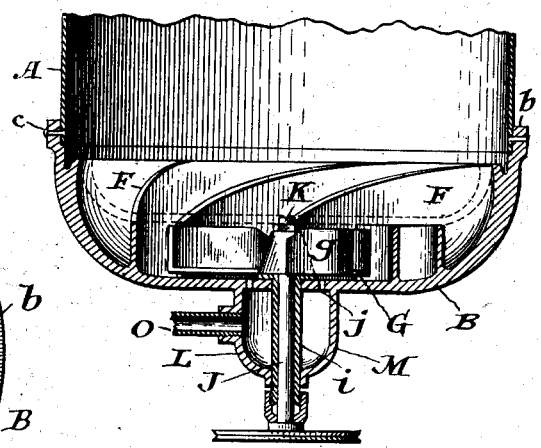
Figure 6:
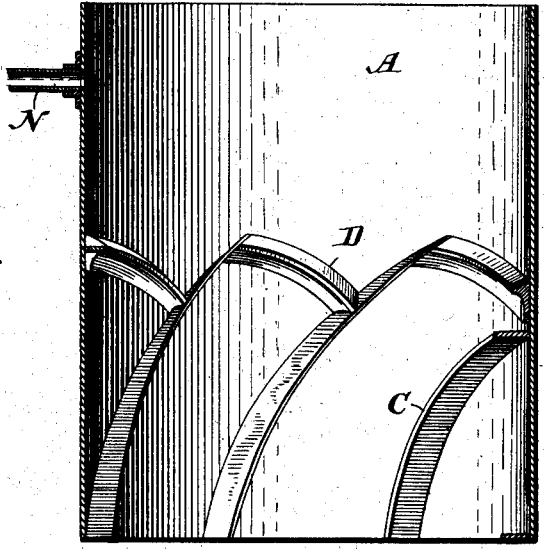

In the accompanying drawings, forming part of my application, and in which similar letters of reference refer to similar parts throughout the several views, Figure 1 is an elevational view of my machine. Fig. 2 is a vertical sectional view taken on the line $x\ x$ of Fig. 1, the interior lining and the basket for containing the dishes being in position. Fig. 3 is a top plan view. Fig. 4 is a similar view of the lower casing. Fig. 5 is a vertical sectional view of the lower casing, the stuffing-box, and a portion of the tank or vessel; and Fig. 6 is a vertical sectional view of the tank or vessel with the lining removed.

A represents a cylindrical tank or vessel resting on the circular casing B. The casing B is provided with a vertical rim $b$, within which the lower edge of the vessel A fits closely and to which it is secured by bolts $c$, forming a water-tight receptacle.

Upon the interior of the cylinder A are formed curved ribs C, extending from the base of the cylinder, inclined from the perpendicular and rising to a point somewhat above the middle of the cylinder.

From the apex of one rib C to a point near the apex of the next succeeding rib C extends a rib or web D, which acts as a water-deflector. It will be seen, Fig. 6, that the series of ribs D acts as a continuous water-deflector around the inner circumference of the tank A.

Within the tank A and fitted closely against the ribs C is a cylindrical lining E, the upper edge $e$ of which is serrated and conforms in shape to the deflector formed by the series of ribs or webs D. The edge $e$ of the lining E is spaced from the ribs D, thus permitting the passage of a volume of water through the space so formed.

The lower casing B, upon which the tank A rests, is basin-shaped and is provided with a series of ribs F, so disposed therein as to form conduits or guides for the upward passage of the water when the latter is agitated or driven by the fan or agitator G in the casing B. The ribs C and F form direct continuous channels from the casing to a point somewhat above the middle of the tank A. Resting on the ribs F and either cast integrally with the casing B or separate therefrom, as desired, is a plate or casting H, having a central aperture $h$, acting as a support for the dish-holder I and designed to act as a means of sucking the water downwardly when it flows over the top of the lining E into the tank A.

The agitator or fan G consists of blades $g$ (preferably three in number, although more or less may be used, as found practicable) and is mounted by a hub $i$ on a vertical shaft J, extending through an opening $j$ in the lower part of the casing B. The blades $g$ are maintained in position on the shaft J by the hub $i$, being bolted thereto by a bolt K or in any other suitable manner. The blades $g$ are of a concavo-convex form and are turned on the shaft J from left to right, their convex surfaces forcing the water into the conduits formed by the ribs F. The shaft J has a bearing in the hub L, extending downwardly from the casing B, and is provided at its lower end with a pulley-wheel suitable for receiving a belt to impart motion to the shaft. A stuffing-box M, depending from the casing B, is provided. This may be of any desired construction, it being shown in the conventional form in the drawings.

Near the upper portion of the tank A a water-inflow N is provided, and an outflow O is situated in the stuffing-box M.

The operation of the device is as follows:

The dishes to be washed are placed in the basket I, which is lowered until it rests upon the plate or ring H. Water through the inflow N is admitted and motion imparted to the agitator G through the shaft J. The blades of the agitator being revolved at a comparatively high rate of speed will force the water in the casing B through the conduits upwardly along the interior of the wall of the tank A, where it is guided by the ribs C until it strikes against the under or concaved portion of the ribs D and deflected outwardly and down into the tank A and over the dishes in the basket I. The water is then sucked through the aperture $h$ in the casing H and passes into the casing B, from which it may be withdrawn.

Having now described my invention, what I claim as new, and desire to secure by Letters Patent, is—

1. In a dish-washing machine, the combination of a tank or vessel, a casing forming a water-tight receptacle with the tank, an agitator within the casing, said tank having a series of webs or ribs upon the interior thereof extending from the base of the tank, and inclined from the perpendicular, and rising to a point somewhat above the middle of the cylinder, substantially as described.

2. In a dish-washing machine, the tank or vessel A having upon its interior surface curved ribs extending from the base, and rising to a point somewhat above the middle of the vessel, and a second series of ribs or webs, each rib of said second series extending from the apex of one of the ribs of the first series to a point near the apex of the next succeeding rib of the second series, substantially as described.

3. In a dish-washing machine, the combination of a tank or vessel, a casing beneath said tank, and an agitator within the casing, said casing being provided on its interior surface with ribs extending upwardly from the bottom and forming guides or conduits for the passage of water into the tank, substantially as described.

4. In a dish-washing machine, the combination of a tank or vessel, a casing with which said tank forms a water-tight receptacle, ribs upon the inner surface of said tank, a lining fitted against said ribs, an agitator within the casing, and means for imparting motion to said agitator, substantially as described.

5. In a dish-washing machine, the combination of a tank or vessel, a casing forming with the tank a water-tight receptacle, an agitator within said casing, and a plate or casting having a central aperture resting on the ribs within said casing, substantially as described.

6. In a dish-washing machine, the combination of a tank or vessel, a casing upon which said tank rests, said tank and casing being provided on their interior surfaces with ribs, and a lining fitting against the ribs in the tank, the upper edge of said lining being serrated and conforming to the shape of a deflector formed by a series of ribs in the tank, substantially as described.

7. In a dish-washing machine, the combination of a tank or cylinder, a casing upon which said tank or cylinder rests, and with which it forms an air-tight receptacle, an agitator within the casing, and a series of ribs disposed within the casing, and a series of ribs on the inner surface of the tank, the two series of ribs forming continuous water-channels from the casing to a point somewhat above the middle of the cylinder, substantially as described.

In witness whereof I have hereunto set my hand in presence of two witnesses.

HAMILTON F. LOW.

Witnesses:
 ANNA T. MALLON,
 OTTO MUNK.